UNITED STATES PATENT OFFICE 2,589,974

1-AMINO-2-ANTHRAQUINONE CARBO-3',4'-XYLIDE

Nicholas W. Solonen and David I. Randall, Easton, Pa., assignors to General Aniline & Film Corporation, New York, N. Y., a corporation of Delaware No Drawing. Application December 26, 1950, Serial No. 202,798

1 Claim. (Cl. 260—377)

The present invention relates to the preparation of a red pigment, to wit, 1-amino-2-anthraquinone carbo-3',4'-xylide, which is very fast to light.

It has been proposed to produce various amino anthraquinone carbo anilides by converting a nitro anthraquinone carboxylic acid to its acyl chloride, reacting the acyl chloride with the aromatic amine, the anilide of which it is desired to produce, and reducing the nitro group in the resulting product.

Products prepared in this way have been suggested for use as pigments. However, the properties of such products are not such as to justify their use in this relationship. Thus the products have weak tinctorial strength and are somewhat dull. The greatest objection, however, is based on the fact that the products have little fastness to light.

For example, compounds prepared as above, while utilizing as the amine, p-toluidine, meta toluidine or hemimellitidine (3,4,5-trimethylaniline), are dull red to bluish red pigments, having a light fastness ranging from 10 to 64 hours in the fadeometer in moderate strength. Products derived from ortho xylidine, mixed xylidines and meta xylidine are yellowish red to bluish red pigments, with a light fastness varying from 14 to 46 hours.

Due to the knowledge possessed by the art, of the characteristics of amino anthraquinone carbo anilides, it had been just about concluded that such products were of little utility as pigments.

We have now discovered, rather surprisingly, that the product obtained from 1-nitro-anthraquinone-2-carboxylic acid and 3,4-xylidine, followed by reduction of the nitro group, are very valuable pigments, possessing a bright red shade and excellent light fastness in light and strong shades. Such product constitutes the purposes and objects of the present invention.

The product which is contemplated herein has the following structural formula:

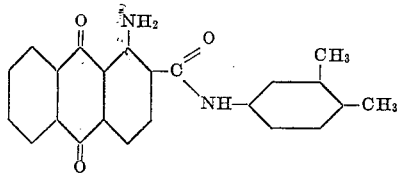

This product is produced by heating 1-nitroanthraquinone-2-carboxylic acid with thionyl chloride to form the acyl chloride. The excess of the thionyl chloride is removed by distillation, preferably by passing dry air through the reaction mixture. 3,4-xylidine is then added to the reaction mixture, and the mixture heated in the presence of an acid binding agent such as pyridine, quinoline, or the like, to effect conversion of the acyl chloride to the amide.

The resulting product is then reduced by means of an alkaline solution of sodium hydrosulfite for the purpose of converting the nitro group to an amino group. Such reduction also reduces the keto groups to the leuco form, and consequently the mixture should be blown with air to oxidize the product back to the keto form.

The following equations indicate the course of the reactions in the formation of the desired end product:

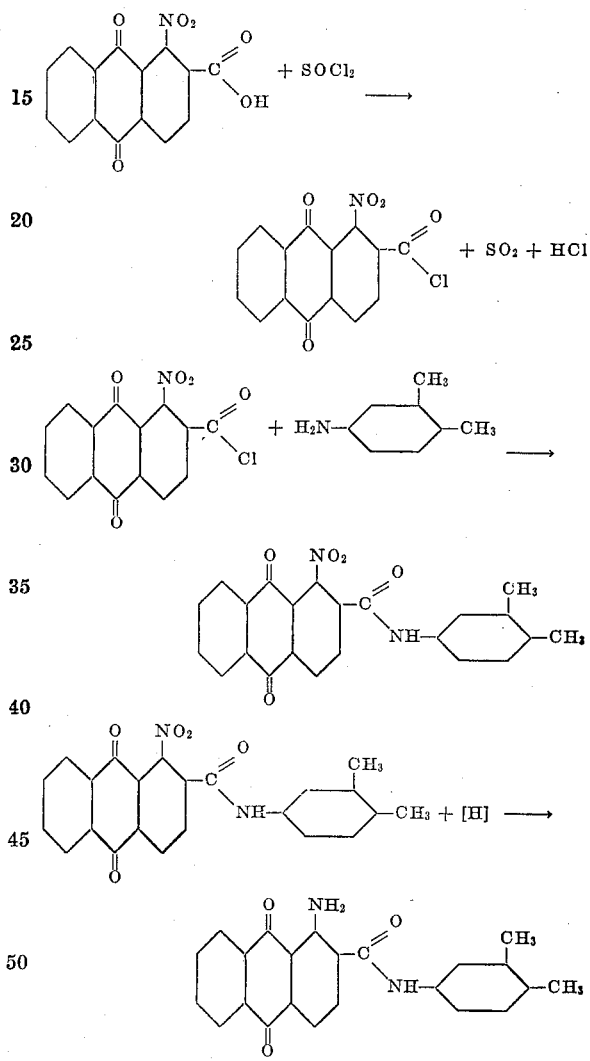

reduce, then oxidize

The following example will serve to illustrate the invention, although it is to be understood that the invention is not restricted thereto. The parts are by weight unless otherwise stated.

Example 60 parts of 1-nitroanthraquinone-2-carboxylic acid was added to 280 parts of anhydrous nitrobenzene followed by the addition of 48 parts of thionyl chloride, and the resulting mixture gradually brought up to 140° C. The mixture was maintained at 140° C. for three hours with efficient stirring. At the end of this time the excess thionyl chloride was distilled off by passing in dry air at 150° C. The reaction mixture was then cooled to room temperature and 32 parts of pyridine added. This was followed by 24.4 parts of 3,4-xylidine. The temperature was brought up to 110° C. and maintained for 2½ hours with efficient stirring. After cooling to room temperature, the product was filtered off and the presscake washed with benzene until the washings were almost colorless. The product was then washed with alcohol and water and finally dried.

Sixty-five and five tenths parts of the nitro derivative obtained as above was added to 1820 parts of water containing 244 parts of sodium hydroxide and 182 parts of sodium hydrosulfite, and the resulting mixture was brought up to 50° C. After maintaining the reaction for 45 min. at 50° C. with efficient stirring, air was passed in until the precipitation of pigment was complete. The product was filtered off and washed until the washings were colorless and then dried.

The product obtained as above had a light fastness in the fadeometer of from 120 to 149 hours.

We claim:

The product of the following constitution

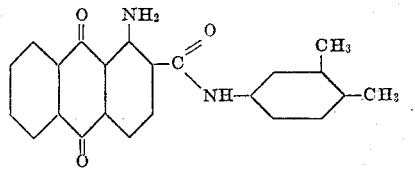

being a red pigment having exceptional fastness to light properties.

NICHOLAS W. SOLONEN.
DAVID I. RANDALL.

No references cited.